(12) United States Patent
Wang (10) Patent No.: US 12,088,167 B1
(45) Date of Patent: Sep. 10, 2024

(54) VIBRATION MOTOR

(71) Applicant: HUBEI ZUANMA INTELLIGENT CONTROL TECHNOLOGY CO., LTD, E'zhou (CN)

(72) Inventor: Sen Wang, Dongguan (CN)

(73) Assignee: HUBEI ZUANMA INTELLIGENT CONTROL TECHNOLOGY CO., LTD, E'zhou (CN)

( * ) Notice: Subject to any disclaimer, the term of this patent is extended or adjusted under 35 U.S.C. 154(b) by 0 days.

(21) Appl. No.: 18/602,137

(22) Filed: Mar. 12, 2024

(30) Foreign Application Priority Data

Feb. 2, 2024  (CN) .......................... 202420265543.5

(51) Int. Cl.
 *H02K 33/02* (2006.01)
(52) U.S. Cl.
 CPC .................................... *H02K 33/02* (2013.01)
(58) Field of Classification Search
 CPC .......... H02K 5/22; H02K 5/225; H02K 11/30; H02K 33/02; H02K 11/33
 See application file for complete search history.

(56) References Cited

U.S. PATENT DOCUMENTS

| | | | | |
|---|---|---|---|---|
| 2013/0169071 | A1* | 7/2013 | Endo | H02K 33/12 310/25 |
| 2020/0381987 | A1* | 12/2020 | Takahashi | H02K 33/02 |
| 2020/0389078 | A1* | 12/2020 | Takahashi | H02K 33/12 |
| 2022/0209639 | A1* | 6/2022 | Hirata | H02K 33/16 |

* cited by examiner

*Primary Examiner* — Tulsidas C Patel
*Assistant Examiner* — Robert E Mates
(74) *Attorney, Agent, or Firm* — Daniel M. Cohn; Howard M. Cohn (57) ABSTRACT

A vibration motor, related to a technical field of motor disassembly and assembly, including a motor bottom housing and a motor surface cover, the motor main housing defines an accommodating cavity, a vibration mechanism is disposed in the accommodating cavity, the vibration mechanism includes a support and a vibration assembly, and the vibration assembly is configured to provide vibration for the vibration motor in a single-axis direction. A first welding column and a second welding column are disposed at one end, close to the motor surface cover, of the support. Two electronic wires are provided, a first one of the two electronic wires and a head end of a first coil are welded to the first welding column, a second one of the two electronic wires and a head end of a second coil are welded to the second welding column.

8 Claims, 8 Drawing Sheets

VIBRATION MOTOR

TECHNICAL FIELD

The present disclosure relates to a technical field of motor disassembly and assembly, and in particular to a vibration motor.

BACKGROUND

Linear motors are mainly applied to communication terminals, such as mobile phones, tablet computers, wearable devices, etc. and devices, such as video game controllers, toys, etc., which have advantages of being fast in response speed, high in vibration sensation, small sizes, and are widely popular. However, as for a conventional motor structure, after a coil is wounded on a support, a head end of the coil needs to be subjected to immersion welding, and since a wire body of the coil is welded to a middle portion of the support, an interior of the support is easily damaged when welding the coil. In addition, since an assembly manner for assembling various components of conventional motors require high accuracy in jigs and process technologies, a manufacturing cost thereof is relatively high.

Therefore, how to provide a vibration motor being convenient in the immersion welding of the coil and reducing the manufacturing cost is an urgent technical problem to be solved.

SUMMARY

Technical problems to be solved by the present disclosure is how to provide a vibration motor being convenient in immersion welding of coils and reducing a manufacturing cost thereof.

Therefore, the present disclosure provides a vibration motor, including a motor bottom housing and a motor surface cover. The motor main housing and the motor surface cover are ultrasonically welded, the motor main housing defines an accommodating cavity, a vibration mechanism is disposed in the accommodating cavity, the vibration mechanism includes a support and a vibration assembly, and the vibration assembly is configured to provide vibration for the vibration motor in a single-axis direction. A first mounting groove and a second mounting groove are adjacently defined on an outer wall of the support, a first coil is wound in the first mounting groove, a second coil connected with the first coil is wound in the second mounting groove, and a first welding column and a second welding column are disposed at one end, close to the motor surface cover, of the support. A notch is defined on the motor surface cover, the notch is configured to accommodate the first welding column and the second welding column, and the first welding column and the second welding column pass through the notch, a wire groove is further defined on the motor surface cover, a first end of the wire groove is communicated with the notch, and a second end of the wire groove penetrates through a side wall of the motor surface cover. Two electronic wires are disposed in the wire groove, a first one of the two electronic wires and a head end of the first coil are welded to the first welding column, a second one of the two electronic wires and a head end of the second coil are welded to the second welding column. A first through slot and a second through slot are defined on the support, the head end of first coil passes through the first through slot, and the head end of the second coil passes through the second through slot.

Furthermore, a limiting column for mounting and limiting the two electronic wires are disposed on the motor surface cover.

Furthermore, a third through slot is defined on the support corresponding to the second through slot, and the third through slot is respectively communicated with the first mounting groove and the second mounting groove.

Furthermore, the vibration assembly includes a vibration magnet, the vibration magnet is symmetrically bonded with two transmission members, the two transmission members and the vibration magnet are all located in the support, two elastic pieces are respectively welded to the two transmission members, and the two elastic pieces are respectively clamped at two ends of the support, a first one of the two elastic pieces abuts against an inner wall of the motor main housing, and a second one of the two elastic pieces abuts against the motor surface cover.

Furthermore, two iron sheets are coated on the support, each of the two iron sheets is semi-ring shaped.

Furthermore, a positioning block is disposed on the support, a positioning hole is defined on each of the two iron sheets for the positioning block to insert into.

Furthermore, the support and the positioning block are integrally formed.

Furthermore, each of the two transmission members includes a first transmission ring and a second transmission rod, a corresponding first transmission ring is sleeved on an outer wall of a corresponding second transmission rod. The first transmission ring of each of the two transmission members is bonded to the vibration magnet, and the second transmission rod of each of the two transmission members is fixed to a corresponding one of the two elastic pieces through welding.

The present disclosure has following beneficial effects.

Through providing the vibration for the vibration motor in the single-axis direction by the vibration assembly, disposing the first welding column and the second welding column at the one end, close to the motor surface cover, of the support, welding the first one of the two electronic wires and the head end of the first coil to the first welding column, and welding the second one of the two electronic wires and the head end of the second coil to the second welding column, the vibration motor is provided, when the immersion welding is performed on welding points, the support is not easily damaged, the two iron sheets are semi-ring shaped, no special jig is needed, installation thereof is convenient, moreover, an assembly manner of the vibration motor is simple, so as to reduce the manufacturing cost of the vibration motor.

BRIEF DESCRIPTION OF DRAWINGS

In order to more clearly illustrate embodiments of the present disclosure or technical solutions in the prior art, drawings that need to be used in the embodiments or the prior art are briefly described below, and it is obvious that the drawings in following description are merely some embodiments of the present disclosure, and for those who skilled in the art, other drawings may be obtained according to structures shown in the accompanying drawings.

Reference numerals in the drawings: 1. motor main housing; 11. accommodating cavity 2. motor surface cover; 21. notch; 22. wire groove; 23. limiting column; 3. vibration mechanism; 31. support; 311. first mounting groove; 312. second mounting groove; 313. first through slot; 314. second through slot; 315. third through slot; 316. positioning block; 32. vibration assembly; 321. vibration magnet; 322. elastic piece; 323. iron sheet; 3231. positioning hole; 324. first transmission ring; 325. second transmission rod; 33. first coil; 34. second coil; 35. first welding column; 36. second welding column; 37. electronic wire.

DETAILED DESCRIPTION OF EMBODIMENTS

In order to make purposes, technical solutions, and advantages of the present disclosure clearer, the present disclosure is further described in detail below with reference to accompanying drawings and embodiments. It should be understood that the specific embodiments described herein are merely used to explain the present disclosure, and are not intended to limit the present disclosure.

In description of the present disclosure, it should be noted that unless expressly specified and defined otherwise, the terms "mount", "connect with" and "connect to" shall be broadly construed, for example, the term "connect" may be fixed connection or detachable connection, or integrally connection; may be mechanical connection or electrical connection; may be direct connection or indirect connection through an intermediate medium, or may be a communication between two elements, and may be a wireless connection or a wired connection. For those who skilled in the art, a specific meaning of the above terms in the present disclosure may be specifically understood.

Moreover, in the description of the present disclosure, it should be noted that orientation or positional relationships indicated by terms "central", "upper", "lower", "left", "right", "vertical", "horizontal", "inner", "outer", etc. are based on the orientation or positional relationships shown in the drawings, rather than indicating or implying that a referred device or element must have a specific orientation and must construct and operate in a specific orientation, and therefore cannot be understood as a limitation to the present disclosure. In addition, terms "first", "second", and "third" are used for descriptive purposes only and cannot be understood as indicating or implying relative importance.

In addition, technical features involved in different embodiments of the present disclosure described below may be combined with each other as long as there is no conflict between each other.

The present disclosure provides a vibration motor, as shown in FIGS. 1-8, including a motor bottom housing 1 and a motor surface cover. 2 The motor main housing 1 and the motor surface cover 2 are ultrasonically welded, the motor main housing 1 defines an accommodating cavity 11, a vibration mechanism 3 is disposed in the accommodating cavity 11, the vibration mechanism 3 includes a support 31 and a vibration assembly 32, and the vibration assembly 32 is configured to provide vibration for the vibration motor in a single-axis direction.

A first mounting groove 311 and a second mounting groove 312 are adjacently defined on an outer wall of the support 31, a first coil 33 is wound in the first mounting groove 311, a second coil 34 connected with the first coil 33 is wound in the second mounting groove 312, and a first welding column 35 and a second welding column 36 are disposed at one end, close to the motor surface cover 2, of the support 31.

A notch 21 is defined on the motor surface cover 2, the notch 21 is configured to accommodate the first welding column 35 and the second welding column 36, and the first welding column 35 and the second welding column 36 pass through the notch 21, a wire groove 22 is further defined on the motor surface cover 2, a first end of the wire groove 22 is communicated with the notch 21, and a second end of the wire groove 22 penetrates through a side wall of the motor surface cover 2.

Two electronic wires 37 are disposed in the wire groove 22, a first one of the two electronic wires 37 and a head end of the first coil 33 are welded to the first welding column 35, a second one of the two electronic wires 37 and a head end of the second coil 34 are welded to the second welding column 36. A first through slot 313 and a second through slot 314 are defined on the support 31, the head end of first coil 33 passes through the first through slot 313, and the head end of the second coil 34 passes through the second through slot 314. In a specific implementation process, the first coil 33 and the second coil 34 are copper wires.

It should be noted that through providing the vibration for the vibration motor in the single-axis direction by the vibration assembly 32, disposing the first welding column 35 and the second welding column 36 at the one end, close to the motor surface cover 2, of the support 31, welding the first one of the two electronic wires 37 and the head end of the first coil 33 to the first welding column 35, and welding the second one of the two electronic wires 37 and the head end of the second coil 34 to the second welding column 36, the vibration motor is provided, when the immersion welding is performed on welding points, the support 31 is not easily damaged, an assembly manner of the vibration motor is simple, so as to reduce the manufacturing cost of the vibration motor.

Figure 4:
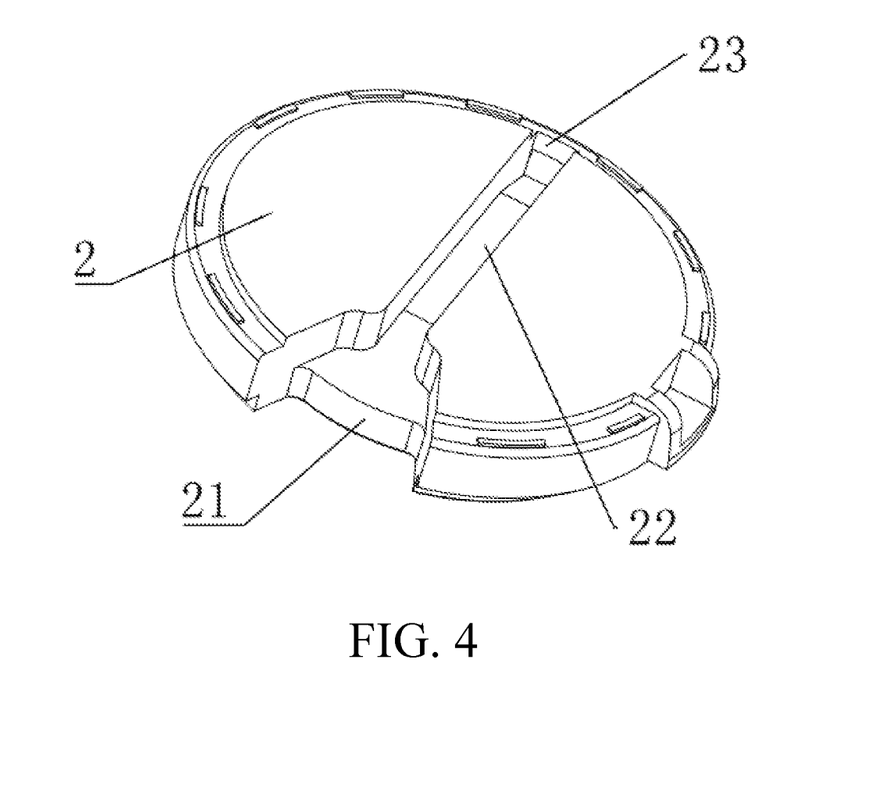
FIG. 4 is a structural schematic diagram of a motor surface cover of the vibration motor according to one embodiment of the present disclosure.

As shown in FIG. 4, a limiting column 23 for mounting and limiting the two electronic wires 37 are disposed on the motor surface cover 2. It should be noted that the limiting column 23 is provided for conveniently mounting and limiting the two electronic wires 27 in the wire groove 22.

Figure 5:
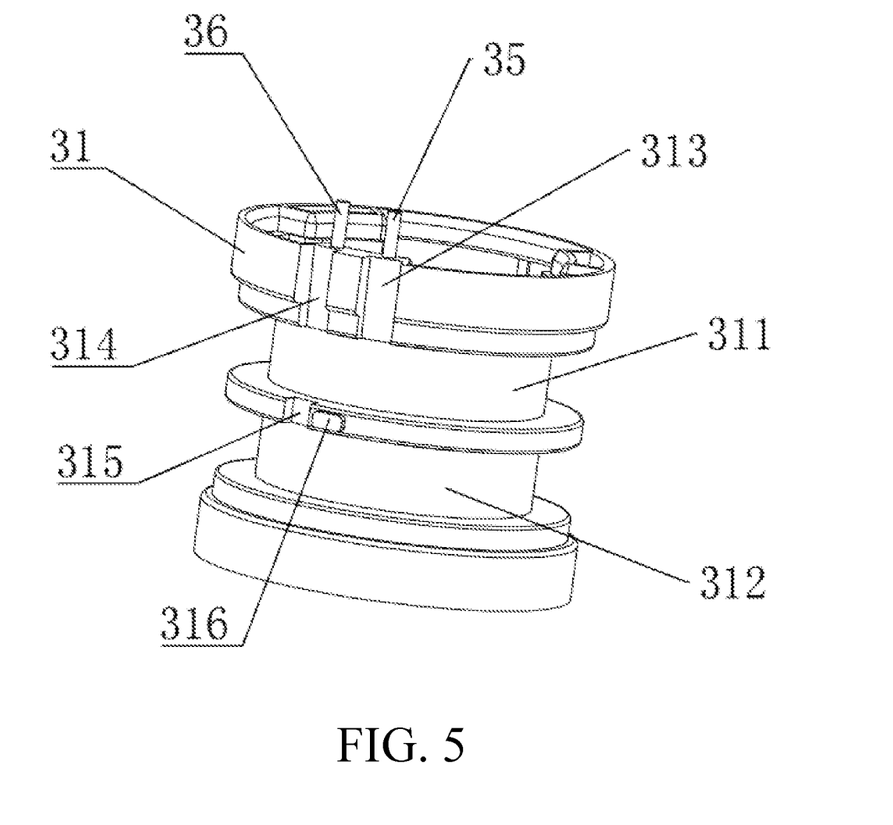
FIG. 5 is a structural schematic diagram of a support of the vibration motor according to one embodiment of the present disclosure.

As shown in FIG. 5, a third through slot 315 is defined on the support 31 corresponding to the second through slot 314, and the third through slot 315 is respectively communicated with the first mounting groove 311 and the second mounting groove 312. It should be noted that the third through slot 215 is provided for conveniently connecting the first coil 33 and the second coil 34 in a winding manner.

Figure 1:
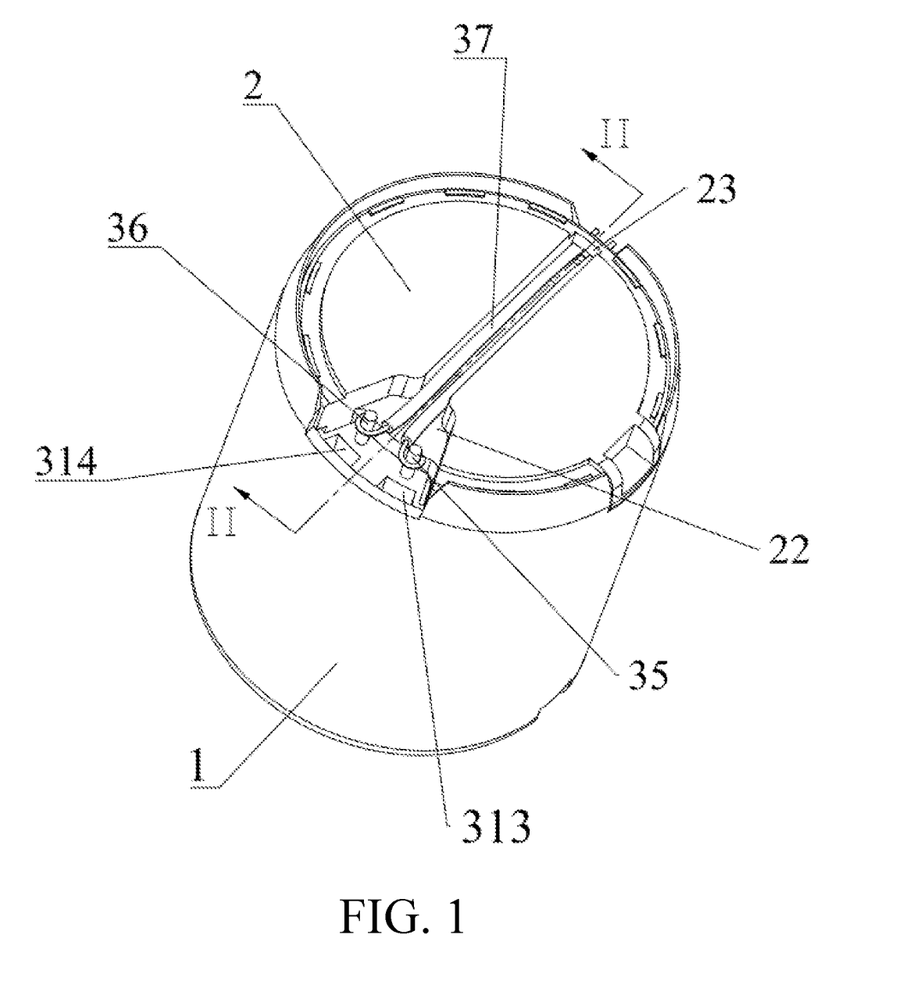
FIG. 1 is a three-dimensional structural schematic diagram of a vibration motor according to one embodiment of the present disclosure.
Figure 2:
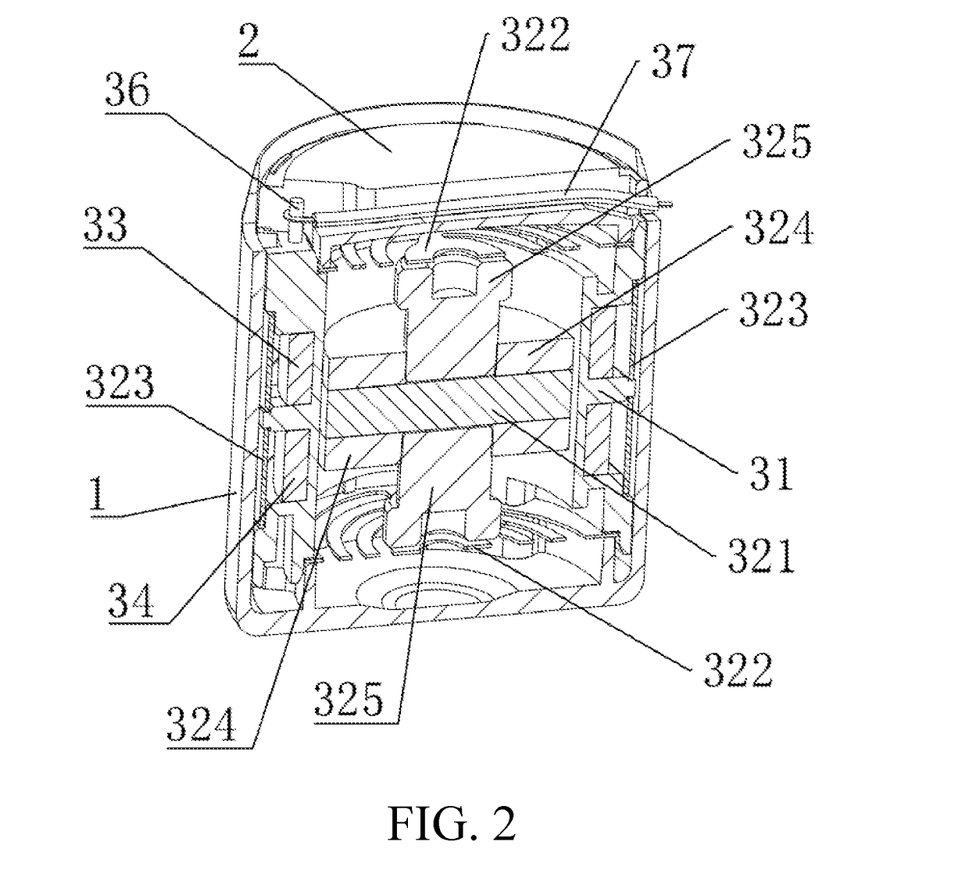
FIG. 2 is a cross-sectional schematic diagram of the vibration motor taken along line II-II shown in FIG. 1.
Figure 3:
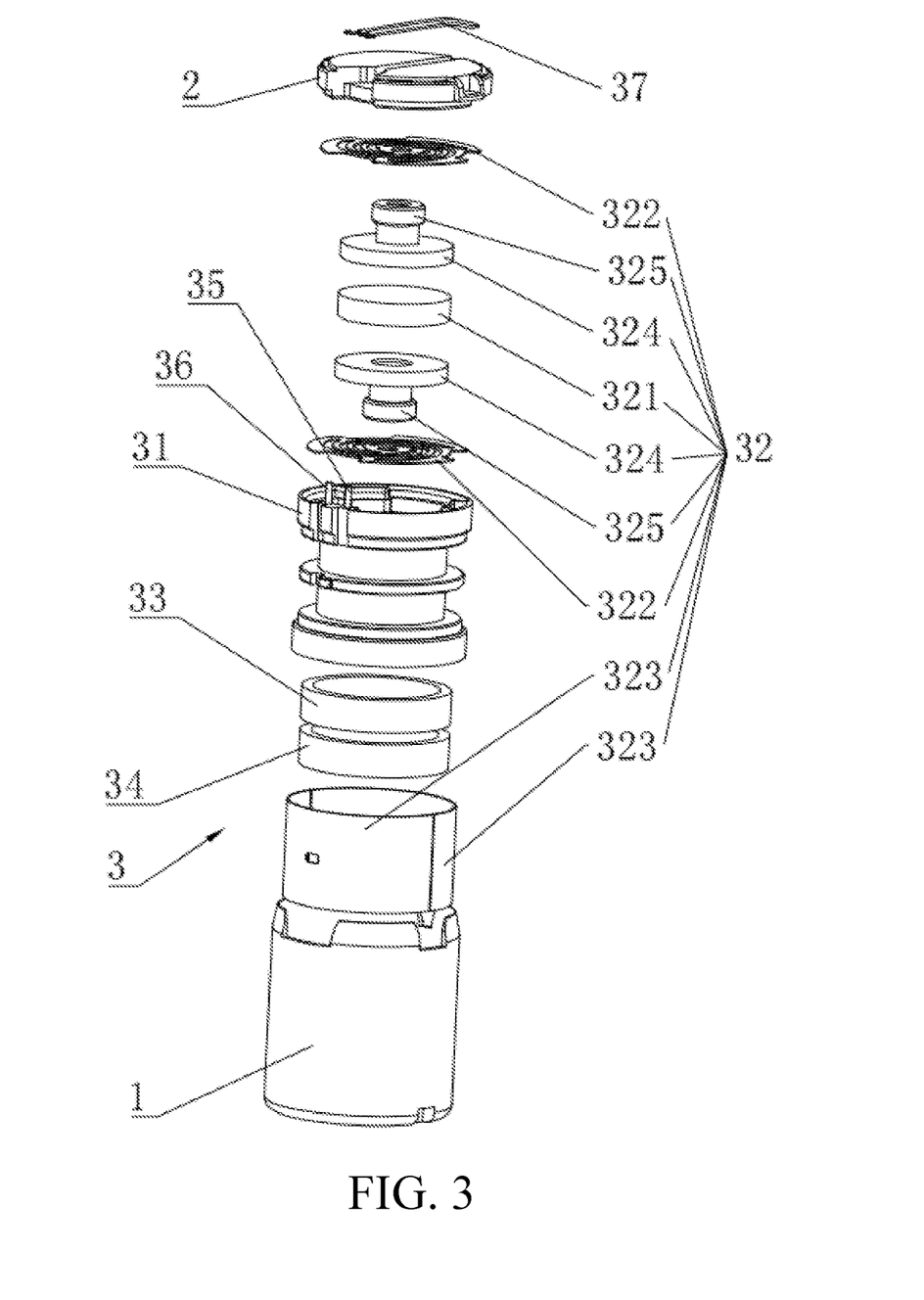
FIG. 3 is an exploded structural schematic diagram of the vibration motor according to one embodiment of the present disclosure.

As shown in FIGS. 2-3, the vibration assembly 32 includes a vibration magnet 321, the vibration magnet 321 is symmetrically bonded with two transmission members, the two transmission members and the vibration magnet 321 are all located in the support 31, two elastic pieces 322 are respectively welded to the two transmission members, and the two elastic pieces 322 are respectively clamped at two ends of the support 31, a first one of the two elastic pieces 322 abuts against an inner wall of the motor main housing 1, and a second one of the two elastic pieces 322 abuts against the motor surface cover 2. In a specific implementation process, a first end of the support 31 is clamped with the motor main housing 1, and a second end of the support 31 is clamped with the motor surface cover 2.

It should be noted that after the electronic wires 37 are energized, electromagnetic force is generated in the first coil 33 and the second coil 34 and attracts the vibration magnet 321 to move, so as to drive the two transmission members to move, the two elastic pieces 322 are further squeezed, and then vibration is generated on the motor main housing 1 and the motor surface cover 2.

Figure 6:
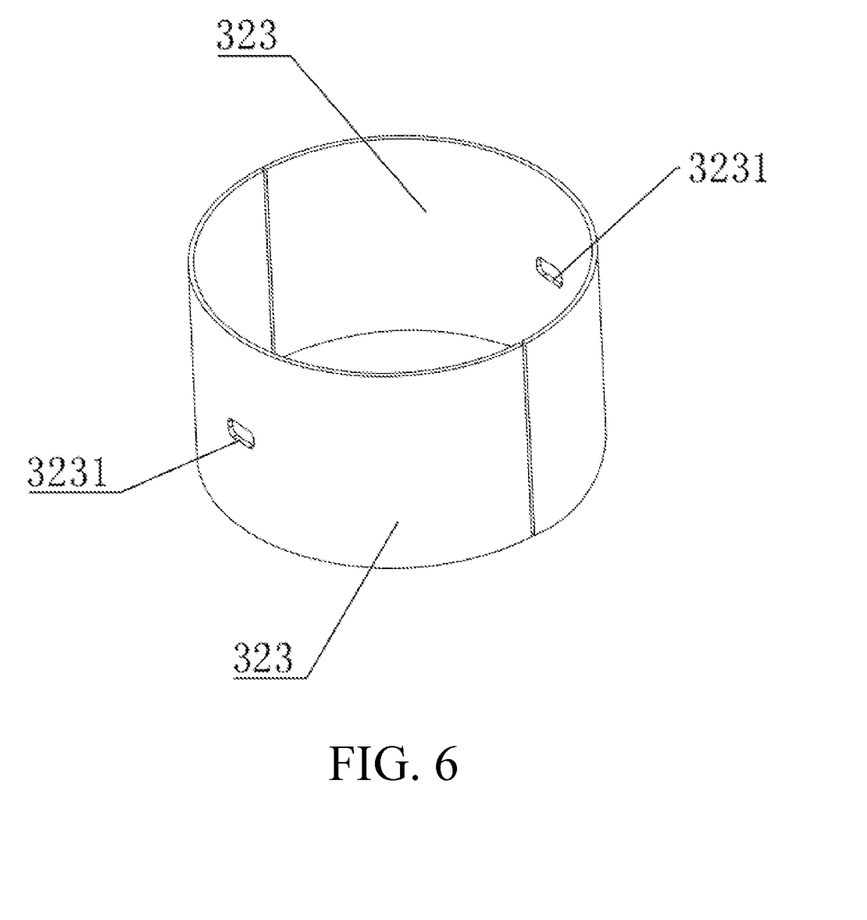
FIG. 6 is a structural schematic diagram of iron sheets of the vibration motor according to one embodiment of the present disclosure.
Figure 7:
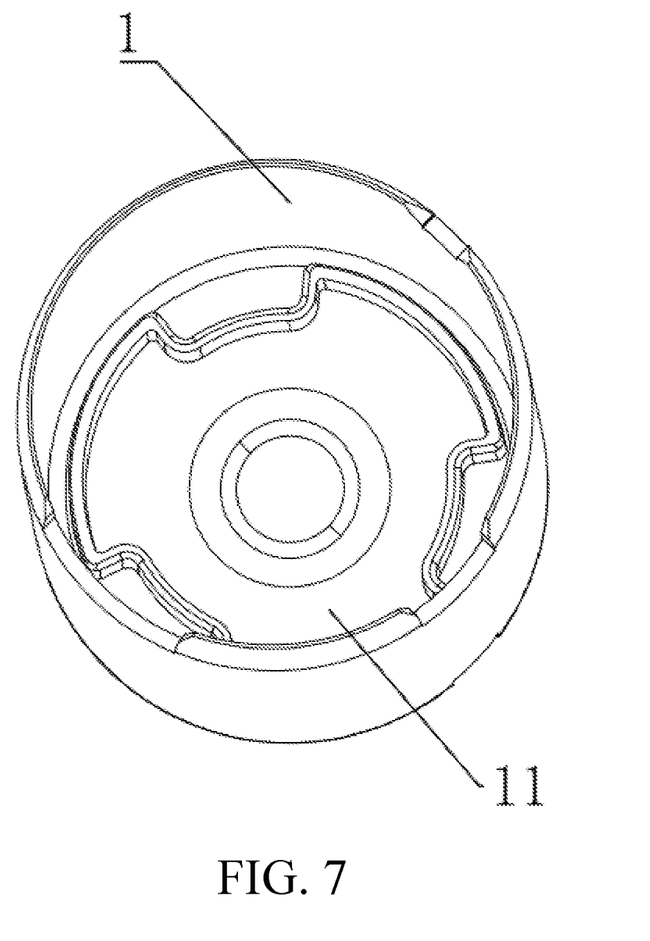
FIG. 7 is a structural schematic diagram of a motor main housing of the vibration motor according to one embodiment of the present disclosure.

As shown in FIGS. 3 and 6, two iron sheets 323 are coated on the support 31, each of the two iron sheets 323 is semi-ring shaped. It should be noted that since the support 31 is coated with the two iron sheets 323, a magnetic field generated after the first coil 33 and the second coil 34 are energized is enhanced, so as to attract the vibration magnet 321 to quickly move. A conventional motor is only provided with one iron sheet, the one iron sheet needs to be rolled into a ring shape and be connected end to end using a special jig during installation, which requires accurate alignment and low installation speed. However, the vibration motor of the present disclosure provides the two iron sheets 323 being semi-ring shaped and clamped with each other, which is simple in structure, convenient in assembly mode, and further improves assembly efficiency of the vibration motor.

As shown in FIGS. 3-6, a positioning block 316 is disposed on the support 31, a positioning hole 3231 is defined on each of the two iron sheets 323 for the positioning block 316 to insert into. It should be noted that, insertion fit between the positioning block 316 and the positioning hole 3231 is convenient for quickly mounting the two iron sheets 323 on the support 31, thereby improving the assembly efficiency of the vibration motor.

As shown in FIG. 5, the support 31 and the positioning block 316 are integrally formed.

Figure 8:
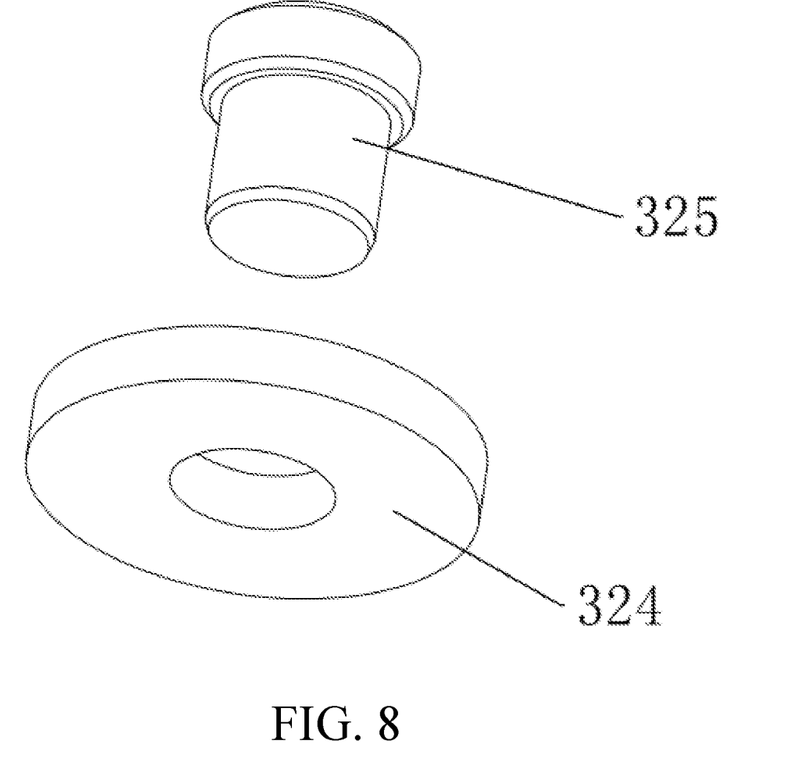
FIG. 8 is an exploded structural schematic diagram of one of transmission members of the vibration motor according to one embodiment of the present disclosure.

As shown in FIGS. 3 and 8, each of the two transmission members includes a first transmission ring 324 and a second transmission rod 325, a corresponding first transmission ring 324 is sleeved on an outer wall of a corresponding second transmission rod 325. The first transmission ring 324 of each of the two transmission members is bonded to the vibration magnet 321, and the second transmission rod 325 of each of the two transmission members is fixed to a corresponding one of the two elastic pieces 322 through welding. In a specific implementation process, the first transmission ring 324 of each of the two transmission members abuts against or is bonded to the vibration magnet 321 so as to quickly assembly the transmission members and the vibration magnet 321. Moreover, since the second transmission rod 325 of each of the two transmission members is fixed to the corresponding one of the two elastic pieces 322 through welding, assembly difficulty of components is reduced, screws are not needed for fastening, a weight of the vibration motor is thereby reduced, and the manufacturing cost of the vibration motor is further reduced.

A working principle of the vibration motor is that an eternal current is accessed through the electronic wires, the external current passes through the first coil 33 and the second coil 34 to generate the electromagnetic force to attract the vibration magnet 321 to move, and a magnitude of the external current is changed to drive the vibration magnet 321 to linearly reciprocate; when the vibration magnet 321 moves, the two transmission members are driven to move to respectively squeeze the two elastic pieces 322, so that the vibration is generated on the motor main housing 1 and the motor surface cover 2 and the vibration motor vibrates in the single-axis direction. When the vibration motor is installed on a handle of a game machine, the vibration motor provides vibration for the handle of the game machine to enhance user experience.

A working principle of the vibration motor is that through providing the vibration for the vibration motor in the single-axis direction by the vibration assembly 32, disposing the first welding column 35 and the second welding column 36 at the one end, close to the motor surface cover 2, of the support 31, welding the first one of the two electronic wires 37 and the head end of the first coil 33 to the first welding column 35, and welding the second one of the two electronic wires 37 and the head end of the second coil 34 to the second welding column 36, the vibration motor is provided, when the immersion welding is performed on welding points, the support 31 is not easily damaged, the two iron sheets 323 are semi-ring shaped, no special jig is needed, installation thereof is convenient, moreover, the assembly manner of the vibration motor is simple, so as to reduce the manufacturing cost of the vibration motor.

Obviously, above-mentioned embodiments are merely examples which are clearly illustrated, and are not limited to the embodiments. For those who skilled in the art, other different forms of changes or variations can be made on the basis of the above description. There is no need for all implementations to be exhaustive herein. It should be apparent from the present disclosure that variations or variations are still within a scope of protection created by the present disclosure.

What is claimed is:

1. A vibration motor, comprising:
a motor main housing; and
a motor surface cover;
wherein the motor main housing and the motor surface cover are ultrasonically welded, the motor main housing defines an accommodating cavity, a vibration mechanism is disposed in the accommodating cavity, the vibration mechanism comprises a support and a vibration assembly, and the vibration assembly is configured to provide vibration for the vibration motor in a single-axis direction;
a first mounting groove and a second mounting groove are adjacently defined on an outer wall of the support, a first coil is wound in the first mounting groove, a second coil connected with the first coil is wound in the second mounting groove, and a first welding column and a second welding column are disposed at one end, close to the motor surface cover, of the support;
a notch is defined on the motor surface cover, the notch is configured to accommodate the first welding column and the second welding column, and the first welding column and the second welding column pass through the notch, a wire groove is further defined on the motor surface cover, a first end of the wire groove is communicated with the notch, and a second end of the wire groove penetrates through a side wall of the motor surface cover; and
two electronic wires are disposed in the wire groove, a first one of the two electronic wires and a head end of the first coil are welded to the first welding column, a second one of the two electronic wires and a head end of the second coil are welded to the second welding column; a first through slot and a second through slot are defined on the support, the head end of first coil passes through the first through slot, and the head end of the second coil passes through the second through slot.

2. The vibration motor according to claim 1, wherein a limiting column for mounting and limiting the two electronic wires are disposed on the motor surface cover.

3. The vibration motor according to claim 1, wherein a third through slot is defined on the support corresponding to the second through slot, and the third through slot is respectively communicated with the first mounting groove and the second mounting groove.

4. The vibration motor according to claim 1, wherein the vibration assembly comprises a vibration magnet, the vibration magnet is symmetrically bonded with two transmission members, the two transmission members and the vibration magnet are all located in the support, two elastic pieces are respectively welded to the two transmission members, and the two elastic pieces are respectively clamped at two ends of the support, a first one of the two elastic pieces abuts against an inner wall of the motor main housing, and a second one of the two elastic pieces abuts against the motor surface cover.

5. The vibration motor according to claim 4, wherein two iron sheets are coated on the support, each of the two iron sheets is semi-ring shaped.

6. The vibration motor according to claim 5, wherein a positioning block is disposed on the support, a positioning hole is defined on each of the two iron sheets for the positioning block to insert into.

7. The vibration motor according to claim 6, wherein the support and the positioning block are integrally formed.

8. The vibration motor according to claim 4, wherein each of the two transmission members comprises a first transmission ring and a second transmission rod, a corresponding first transmission ring is sleeved on an outer wall of a corresponding second transmission rod; the first transmission ring of each of the two transmission members is bonded to the vibration magnet, and the second transmission rod of each of the two transmission members is fixed to a corresponding one of the two elastic pieces through welding.

\* \* \* \* \*